(No Model.)
J. S. DU BOIS.
PROCESS OF PRESERVATION OF VEGETABLE SUBSTANCES.
No. 553,976. Patented Feb. 4, 1896.
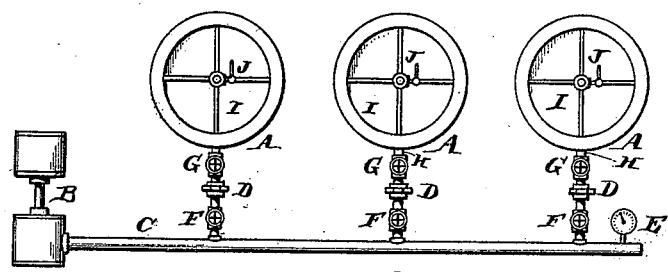
FIG. 1.
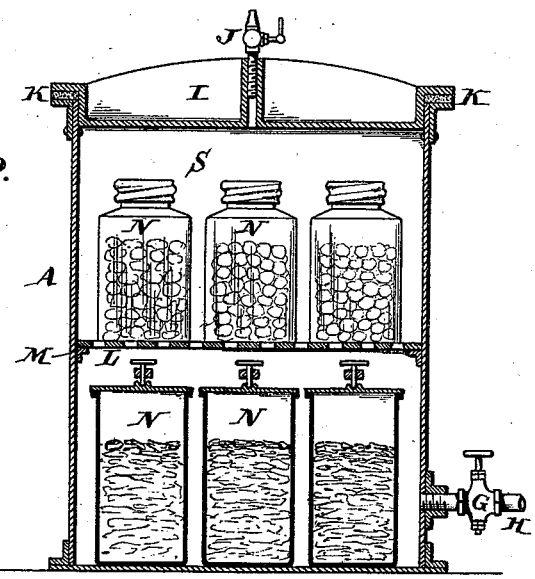
FIG. 2.
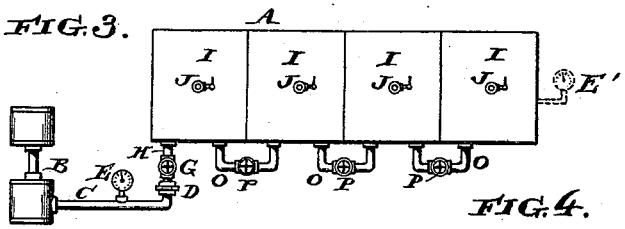
FIG. 3.
FIG. 4.
Witnesses:
Henry Drury
John A. Bramley
Inventor:
Josiah S. DuBois
By his atty

UNITED STATES PATENT OFFICE.

JOSIAH S. DU BOIS, OF CAMDEN, NEW JERSEY.

PROCESS OF PRESERVATION OF VEGETABLE SUBSTANCES.

SPECIFICATION forming part of Letters Patent No. 553,976, dated February 4, 1896.

Application filed August 21, 1891. Serial No. 403,277. (No model.)

*To all whom it may concern:*

Be it known that I, JOSIAH S. DU BOIS, of the city and county of Camden and State of New Jersey, have invented an Improvement in Apparatus and Processes for the Preservation of Vegetable Substances, of which the following is a specification.

My invention has reference to apparatus and process for the preservation of vegetable substances; and it consists of certain improvements which are fully set forth in the following specification and are shown in the accompanying drawings which form a part thereof.

My object is to provide suitable means for the carrying on of a process especially adapted for the preservation of vegetable substances, such as fruits, whereby the same may be shipped considerable distances and maintained on sale or for family use for lengthy periods of time without deterioration.

In carrying out my invention I provide a suitable receptacle having one or more compartments, in which the fruit or vegetable substances are placed, preferably in independently-removable receptacles pervious to air. The main receptacle is provided with an air-tight cover and made impervious to the atmosphere, so that a vacuum or partial vacuum may be maintained within the said receptacle for any given period of time. The vessel is provided with means for hermetically sealing it after the vacuum is produced therein, thereby preventing the entrance of the atmosphere to the vegetable substances contained therein. The vessel is also provided with means to permit the entrance of air from the atmosphere to within the vessel when it is desired to open the same and remove the contents. The cover is preferably formed of a removable part held in place upon a suitable packing by the atmospheric pressure exerted upon it after the air has been exhausted from the receptacle. The receptacle when filled with the fruit or vegetable substances may be shipped to any desired distance, and kept for reasonable periods of time without deterioration in the quality of the fruit or vegetable substance. The vessel may be opened when it is desired to sell or use the contents. By these means a merchant may retain goods in a series of these vessels and open them one at a time as the contents thereof are sold. The vessels containing the fruit or vegetable substances may be in the form of jars or baskets, or in the usual receptacles in which fruit or vegetable substances are commonly placed when offered for sale, but in all cases the fruit or vegetable substances shall be exposed to the action of the vacuum-creating devices employed to produce the vacuum within the main receptacle, so that all air which surrounds the fruit may be entirely removed. In place of using a series of receptacles to permit the opening of separate compartments at different times I may employ a receptacle having a series of compartments adapted to be exhausted at one operation and so arranged as to be capable of being opened separately, as desired.

Referring to the drawings, Figure 1 shows a plan view of an apparatus for carrying out my improved process. Fig. 2 is a sectional elevation of one of the receptacles shown in Fig. 1. Fig. 3 is a plan view of a modified arrangement of my improved apparatus in which the receptacle is provided with a series of compartments, and Fig. 4 is a sectional elevation of same.

A are the receptacles in which the vacuum is produced and in which the vegetable substances or fruits are placed for preservation. I are covers for said receptacles, which rest upon rubber or leather packing K. When a vacuum is produced within the receptacle by exhausting the air from the compartment S therein, the cover I is pressed down by the action of atmospheric pressure and thus hermetically seals the receptacle. A vent-cock J in the cover may be employed to destroy the vacuum when it is desired to release the cover. This vent-cock J may be placed upon any portion of the receptacle A, if desired, in place of using it upon the cover. The interior receptacle may be formed in one compartment and entirely filled with fruit or vegetable substances, or it may be provided with perforated supports or trays L, resting upon projections M, for supporting the vessels N above other vessels arranged upon the bottom of the receptacle A, as shown in Fig. 2.

The vessels N containing the fruit or vegetable substances may be one or more in number, and may be formed in any manner desired, so long as they are not hermetically sealed. Ordinary jars, baskets, crates, or any kind of box may be employed for this purpose.

Each of the receptacles A is provided with a short extension of pipe H, provided with a valve G, and this section of pipe is adapted to be connected with a suction-main C by means of detachable couplings D of any suitable description.

B is a vacuum-pump for exhausting the air from the several receptacles A through the pipes H and C.

F are a series of valves for closing the entrance from the main C to any one of the extensions adapted to be coupled with the couplings D.

E is a vacuum-gage which may be either upon the main C or directly upon the receptacles, as indicated at E' in Fig. 3, for indicating the extent of the vacuum produced.

When the apparatus shown in Fig. 1 is in operation for charging, the valves G and P are opened, and after the necessary vacuum is produced said valves are closed and the couplings D uncoupled, so that the receptacles A may be shipped to any place desired.

Referring to the constructions shown in Figs. 3 and 4, I have the receptacle A formed with a series of independent compartments S S S S, of which there may be any number. Each of these compartments is provided with an independent cover resting upon a packing K and provided with an independent vent-cock J. L represents trays or shelves within the several chambers S, but these may be omitted, if desired. The adjacent chambers S are connected by a short section of pipe O provided with a valve P. One of the receptacles is also provided with a pipe extension H provided with a valve G, as in the case of the construction shown in Figs. 1 and 2. The pipe H is connected to the main C by a coupling D, the said main communicating as before with the vacuum-pump B. After the chambers S are filled with fruit or vegetable substances, the covers I are laid in place and vent-cocks J closed, the valves P are opened and the air from all the chambers S is exhausted by the action of the vacuum-pump B. After the proper vacuum is produced, the valves G and P are closed, and the vessel may then be shipped to its destination. The merchant may open any one of the several compartments by simply opening the vent-cock J corresponding to said compartment, and in so doing he will still maintain in a sealed condition the several remaining chambers. For family use the receptacles may be filled and an employé of the company leasing or selling the receptacles will call upon notice and apply the vacuum-pump. In this manner it would not be necessary for every person to have a vacuum-pump and hence the cost of the apparatus would be greatly reduced.

I do not confine myself to the mere details of construction of the apparatus herein set out, as it is evident that it may be modified in various ways without departing from the principles of my invention.

Having now described my invention, what I claim as new, and desire to secure by Letters Patent, is—

1. The combination of a receptacle having a removable door or lid adapted to make an air-tight joint, a valved orifice connecting with the interior of said receptacle and terminating at the outside in a coupling-joint whereby the receptacle may be detachably connected with a vacuum-creating device for shipment, and a vessel pervious to the atmosphere supported within the receptacle for sustaining the fruit or vegetable substances in position to permit the air to escape from about them upon the creation of the vacuum and permit the said substances to be readily removed upon opening the receptacle.

2. The combination of a receptacle having a removable door or lid adapted to make an air-tight joint, a valved orifice connecting with the interior of said receptacle and terminating at the outside in a coupling-joint whereby the receptacle may be detachably connected with a vacuum-creating device for shipment, and a vessel pervious to the atmosphere removably supported within the receptacle for sustaining the fruit or vegetable substances in position to permit the air to escape from about them upon the creation of the vacuum and permit the said substances to be readily removed upon opening the receptacle, with the vacuum-creating device having a suction device and a coupling at the termination of the suction-pipe adapted to connect with the coupling of the valved orifice of the receptacle.

3. The combination of a receptacle having a removable door or lid, a packing between the door and lid and the receptacle, a valved orifice connecting with the interior of said receptacle, a vent-cock for permitting the inflow of air to within the receptacle when it is desired to destroy the vacuum within the same, and one or more independent vessels for containing the fruit or vegetable substances pervious to the atmosphere located within the receptacle and removable therefrom.

4. The combination of a series of receptacles having air-tight lids or covers, a vent-cock for each of said receptacles to permit the entrance of air into said receptacles, outlet-pipes H for each of said receptacles provided with a valve G, a vacuum-creating device B and a main C having valved orifices and detachable couplings D for connecting the pipes H with the main C.

5. A receptacle for containing and shipping fruit and vegetable substances, consisting of a single case divided into two or more independent air-tight chambers, independent air-tight doors for each of said chambers, independent vent-cocks for admitting air independently to each of said chambers, and valved pipes for permitting the air to be drawn from the several chambers, whereby the contents thereof may be subjected to partial vacuum.

6. A receptacle for containing and shipping fruit and vegetable substances, consisting of a single case divided into two or more independent air-tight chambers, independent air-tight doors for each of said chambers, independent vent-cocks for admitting air to each of said chambers, valved pipes connecting the adjacent chambers and a valved suction-pipe from one of the chambers, whereby when all valves are opened the air may be exhausted from the several chambers through the suction-pipe, and whereby the several chambers may be sealed against communication when it is desired to open one and not the remaining ones.

7. In a receptacle for preserving and shipping fruit and vegetable substances, the combination of a receptacle with a detachable air-tight cover or lid, a removable tray or support having perforations or openings and supported within the receptacle at a distance from its bottom, independent vessels for containing the fruit or vegetable substances pervious to air and supported within the receptacle and upon the tray, a vent-cock to permit the inflow of air into the receptacle, and a valved suction-pipe for permitting the air to be withdrawn from the receptacle and the latter sealed for shipment.

In testimony of which invention I have hereunto set my hand.

JOSIAH S. DU BOIS.

Witnesses:
ERNEST HOWARD HUNTER,
J. A. BRAMLEY.